Patented May 19, 1953

2,639,285

UNITED STATES PATENT OFFICE 2,639,285

PRODUCTION OF THIAZOLYLAMINES

Clarence W. Sondern, Mendham, and Philip J. Breivogel, Glen Ridge, N. J., assignors to White Laboratories, Incorporated, Newark, N. J., a corporation of New Jersey No Drawing. Application December 15, 1948,
Serial No. 65,528

5 Claims. (Cl. 260—306.8)

The present invention relates to thiazolylamines, and is more specifically concerned with a novel procedure and products useful in the synthesis thereof.

Various thiazolylamine derivatives, e. g., N,N-dimethyl-N'-benzyl-N'-(2-thiazolyl) - ethylenediamine and related compounds, have recently attained prominence in the field of anti-histaminics. The novel process of the present invention, with its favorable economical and technical aspects, has an important application in the commercial production of these new drugs.

Compounds of the general formula

wherein R is selected from hydrogen, alkyl, aralkyl and aryl groups, and the two unsatisfied valences indicate substituents on the nitrogen atom, have previously been prepared by the condensation of a selected 2-halothiazole with the corresponding secondary amine (having a hydrogen atom in place of the 2-thiazole nucleus shown in the formula above). Such condensations have been customarily conducted in the presence of an acid-binding agent to absorb or combine with all of the hydrogen halide liberated during the condensation. While such procedure is operative and generally satisfactory, the process requires preparation of the halothiazole and the selected secondary amine, and subsequent condensation thereof to produce the desired thiazolylamine. It would be highly advantageous to have available a method of preparing such thiazolylamines which does not require preparation of the relatively expensive halothiazole, but which could be used to synthesize the thiazolyl radical on the nitrogen atom of an already established secondary amine. Such procedure would obviate the necessity of using a halothiazole as a starting material, would thus be more economical from the standpoint of starting materials employed, and would have other obvious technical advantages not realized with prior art processes.

It is, therefore, an object of the present invention to provide a novel process for the production of certain tertiary thiazolylamines. A further object of the invention is the provision of such a novel process whereby the thiazole nucleus is synthesized on the nitrogen atom of an already established secondary amine radical of a specific type. Another object of the invention is to provide such a process which proceeds from a specific type of secondary amine to a cyanamide, then to a thiourea, and finally to the thiazolylamine. Still a further object of this invention is the provision of certain novel compounds useful in preparing certain thiazolylamines according to the process of the present invention. Another object of the present invention is the provision of novel thiazolylamines. Other objects of the invention will become apparent hereinafter.

We have found that a secondary amine of the formula:

(1)

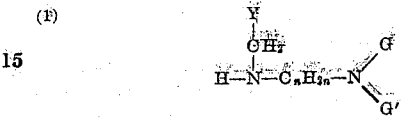

wherein group Y is phenyl, cycloalkyl, thienyl, or alkyl, alkoxy, halo, and hydroxy nuclearly-substituted derivatives thereof, wherein G and G' are alkyl or aralkyl radicals, which may be the same or different, or the remainder of a heterocyclic ring, and wherein $n$ is an integer from 1 to 4, inclusive, may be converted to a nitrile of the formula:

(2)

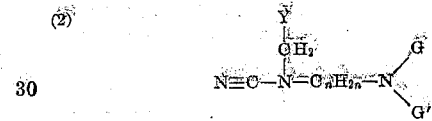

wherein $n$, Y, G, and G' have the values given above, by reaction of the tertiary hydrogen of the amine with a cyanogen halide of the formula:

(3) 

wherein X is chlorine, bromine or iodine. This is Step I in our new process.

We have also found that the nitrile (2) above may be converted to a thiourea of the formula:

(4)

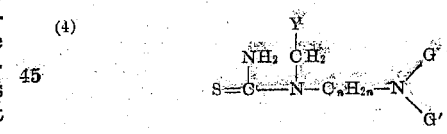

wherein $n$, Y, G, and G' have the values given above, by reaction of the nitrile group (—C≡N) thereof with hydrogen sulfide, (H₂S). This is Step II of our process.

We have further found that the

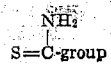

S=C-group of the thiourea (4) may be reacted with a reagent (5), which is a compound having the formula (5) 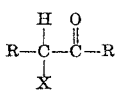

wherein R is a radical selected from the group consisting of hydrogen, alkyl, aralkyl and aryl, said R's may be the same or different, and wherein X is a halogen selected from the group consisting of chlorine, bromine and iodine, or an agent which is convertible to such a haloaldehyde or haloketone. The thiourea is thus transformed into a 2-thiazolylamine of the formula:

(6) 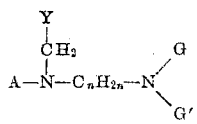

wherein $n$, Y, G, and G' have the values previously assigned and wherein A is a 2-thiazole ring of the formula:

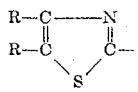

wherein R has the hereinbefore assigned values, depending upon the reagent employed in reaction with the thiourea. This is Step III in our new process.

It should be obvious from the foregoing, that, by our new process, we have provided a new and simple process for converting a specific type of secondary amine to a specific type of tertiary 2-thiazolyamine, or, if desired, to any intermediate point in the process, e. g., to the nitrile or the thiourea.

Step I of our process employs as the starting secondary amine (1) a compound having the formula:

(1) 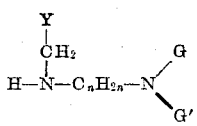

wherein Y is phenyl, cycloalkyl, thienyl or an alkyl, alkoxy, halo or hydroxy nuclearly-substituted derivative thereof, for example, p-ethylphenyl, m-methoxyphenyl, p-chlorophenyl, o-hydroxyphenyl, p-hydroxyphenyl, 3,4-dimethoxyphenyl, p-fluorophenyl, o-iodophenyl, cyclopentyl, cyclohexyl, chlorocyclopentyl, hydroxycyclohexyl, methoxycyclohexyl, ethylcyclopentyl, 5-bromo-2-thienyl, 2-thienyl, 5-methyl-2-thienyl, et cetera, wherein $n$ is an integer from one to four, inclusive, and wherein G and G' are alkyl or aralkyl radicals which may be the same, different or the remainder of a heterocyclic ring, for example, methyl, ethyl, propyl, isopropyl, butyl, amyl, isoamyl, octyl, decyl, tridecyl, benzyl, phenethyl, pyrrolidino, piperidino, morpholino, thiomorpholino, methylpiperidino, et cetera.

Representative secondary amines which may be employed are $N^2$-propyl-$N^2$-isobutyl-$N^3$-(p-chlorobenzyl) - 2,3 - propanediamine, $N^2,N^2$ - dimethyl - $N^1$ - (p - bromobenzyl) - 1,2 - propanediamine, $N^1$ - ethyl - $N^1$ - propyl - $N^3$ - (2-thenyl) - 1,3 - butanediamine, N,N - diisopropyl - N' - [2-(5-chlorothenyl)] - methylenediamine, $N^1,N^1$-dimethyl - $N^2$ - (3-thenyl) - 1,2 - propanediamine, N,N - dimethyl - N' - [2-(5-methylthenyl)]-ethylenediamine, N,N - dipropyl - N' - [2-(3-chlorothenyl)] - ethylenediamine, N,N - dimethyl - N' - (2-thenyl) - methylenediamine, $N^1,N^1$-dimethyl - $N^3$ - (2-thenyl) - 1,3 - propanediamine, N,N - dimethyl - N' - benzylethylenediamine, N,N-dimethyl - N' - benzylmethylenediamine, N,N-diethyl - N' - benzylmethylenediamine, N,N - diethyl - N' - benzylethylenediamine, N,N - dibutyl - N' - benzylethylenediamine, N,N - dibutyl-N' - benzylmethylenediamine, N,N - dicyclohexyl-N' - benzylmethylenediamine, N,N-dihexyl - N'-benzylemethylenediamine, N - ethyl - N - cyclohexylmethyl - N' - benzylethylenediamine, N-ethyl - N - methyl - N' - benzylmethylenediamine, N - methyl - N - ethyl - N' - benzylethylenediamine, N,N - dimethyl - N' - (p-chlorobenzyl) - ethylenediamine, N,N-dimethyl - N' - (p-ethylbenzyl) - ethylenediamine, N-methyl - N - propyl - N' - (p-ethylbenzyl) - ethylenediamine, N,N - dimethyl - N' - (p-methoxybenzyl) - methylenediamine, N,N - dimethyl - N' - (p-methoxybenzyl) - ethylenediamine, N,N-diethyl - N' - (m-ethoxybenzyl) - ethylenediamine, $N^1,N^1$-dimethyl - $N^2$ - benzyl - 1,2 - propanediamine, N - methyl - N - propyl - N' - (m-ethylbenzyl) - ethylenediamine, N - methyl - N - hexyl - N' - benzylethylenediamine, 2 - piperidino - N - (o-methylbenzyl) - ethylamine, piperidino - N - benzylmethylamine, 2 - morpholino - N - benzylethylamine, N,N - diethyl - N' - (4-methoxybenzyl) - methylenediamine, $N^1,N^1$ - diisopropyl - $N^3$ - (p-methylbenzyl) - 1,3 - propanediamine, $N^1,N^1$-dipropyl - $N^2$ - (p-hydroxybenzyl) - 1,2 - propanediamine, $N^1,N^1$ - dihexyl - $N^3$ - (2,4-dichlorobenzyl) - 1,3 - butanediamine, $N^1$ - methyl - $N^1$-hexyl - $N^4$ - (2-thenyl) - 1,4 - butanediamine, morpholino - N - cyclopentylmethylamine, 1-, 2-, or 3-piperidino - N - (2-thenyl) - propylamine, et cetera.

*Step I.*—The first step in the process consists in reacting a cyanogen halide (3) with a secondary amine (1) given above to obtain a substituted cyanamide, as is shown by the following equation:

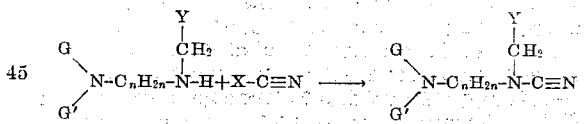

wherein Y, $n$, G and G' have the values previously given, and wherein X represents a halogen selected from the group consisting of chlorine, bromine and iodine. Employment of cyanogen chloride or cyanogen bromide is ordinarily preferred, since their employment ordinarily results in a better yield of the cyanamide.

The reaction may be carried out in any convenient manner, such as by adding the cyanogen halide to the secondary amine. If desired, water or any suitable organic solvent, e. g., ether, methanol, carbon tetrachloride, benzene, et cetera, may be used as a medium for the reaction. The usual temperature range for the reaction is between about −30 degrees and about 50 degrees centigrade, the range between −10 degrees and 10 degrees centigrade being preferred. The preferred procedure is to add the cyanogen halide slowly, say over a period of fifteen minutes, to the secondary amine, which has been dissolved in a suitable solvent and cooled by a conventional arrangement. Stirring or agitation is preferably employed during the reaction period to ensure efficient contact of the reactants. A portion of a basic material, e. g., sodium hydroxide or potassium hydroxide, may be added to the mixture, after the reaction is complete, to liberate the cyanamide from its hydrohalide, if desired. The cyanamide may then be extracted in any convenient manner, such as by the use of ether, and dried. Suitable methods of extraction and purification will be apparent to one skilled in the art.

*Step II.*—This step of the process consists in reacting the substituted cyanamide of Step I with hydrogen sulfide to convert the nitrile group (—C≡N) of the substituted cyanamide to a thiourea group

as illustrated by the following equation:

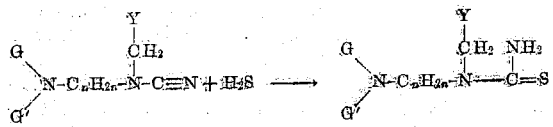

wherein Y, $n$, G and G' have the values previously assigned.

Any convenient procedure for contacting a sufficient amount of hydrogen sulfide with the cyanamide may be employed in this step, the hydrogen sulfide as a gas is usually passed into the cyanamide per se, although the cyanamide may be dissolved in a suitable organic solvent, e. g., ethyl alcohol, methanol, propanol, et cetera, and the gaseous hydrogen sulfide passed into the said solution. An acid-binding agent may be employed to accelerate the reaction; however, it is not an essential element of the reaction. Representative acid-binding agents which may be employed are ammonium hydroxide, triethylamine, triethanolamine, pyridine, et cetera, ammonium hydroxide being preferred. The temperature range for this step is between about —20 degrees and about 100 degrees centigrade with the preferred range being between about —10 degrees and 10 degrees centigrade. If a suitable solvent has been used, after a sufficient period of time, crystals usually form, which may then be filtered off. The mother liquor can then ordinarily be concentrated and another batch of crystals obtained. The crystals thus obtained may be purified in any convenient manner, such as by recrystallization, which will be apparent to one skilled in the art.

*Step III.*—This step involves reacting the substituted thiourea produced in Step II with a compound having the general formula

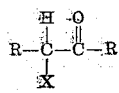

wherein R is selected from the group consisting of hydrogen, alkyl, aralkyl and aryl radicals, the said R's may be the same or different, and wherein X is a halogen selected from the group consisting of chlorine, bromine and iodine. This step of our novel reaction series is illustrated by the following equation:

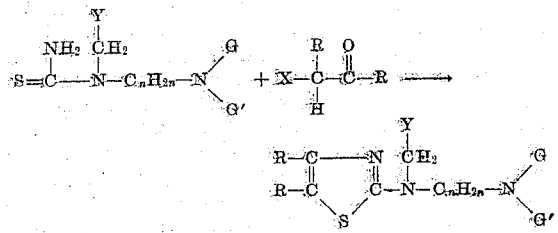

wherein Y, $n$, G, G', X, and R have the values hereinbefore given, the said R's may be the same or different. Representative compounds having the formula

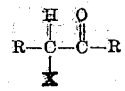

wherein R and X have the values hereinbefore given are, for example monochloroacetone, α-chloropropionaldehyde, iodoacetaldehyde, α-bromophenylacetaldehyde, (α-chlorobenzyl) phenyl ketone, (α-bromobenzyl) benzyl ketone, (α-chlorophenethyl) benzyl ketone, α-chlorodibutyl ketone, acetals and hemi-acetals of the α-haloaldehydes, et cetera.

The temperature range to be maintained in this step is between about room temperature and about 120 degrees centigrade, with the optimum range being between about 70 and 80 degrees centigrade. However, if acetals are employed, which represents a preferred embodiment of the present invention, a temperature of at least 50 degrees centigrade may be employed to ensure the immediate hydrolysis of the acetal. If temperatures above reflux are used, it is desirable that pressure be employed. The reaction may be conducted in any convenient manner, such as by dissolving the reactants in a suitable reaction medium and bringing the temperature to the desired level. Stirring or agitation is preferably employed to ensure efficient contact of the reactants. The reaction time is not critical and will vary considerably depending upon several factors. A portion of basic material, e. g., sodium hydroxide, may be added at the termination of the reaction to liberate the amine from its acid salt, if formed.

Haloacetal, such as chloroacetal, the diethyl acetal of chloroacetaldehyde, are preferred reagents since they are readily obtainable and economical. The use of a haloacetal is possible because of an equilibrium which shifts favorably to produce a haloacetaldehyde in the presence of water and/or acid; said haloacetaldehyde may be generated in situ, if desired. The following equation exemplifies the reaction which makes possible the employment of a haloacetal:

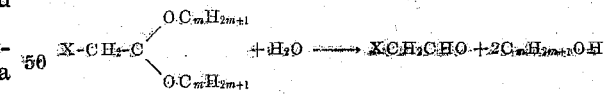

wherein X is a halogen selected from the group consisting of chlorine, bromine and iodine, and wherein $m$ is an integer from 1 to 6, inclusive. It is to be emphasized, however, that although an acetal is employed, the substance breaks down into an aldehyde having the formula

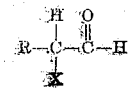

wherein the R has the values hereinbefore assigned.

The product of the reaction of this step is a thiazolyl ring having a nitrogen substituent in the 2-position, and, dependent upon the reagent used, various substituents in the 4- and 5-positions. For example, if an α-haloaldehyde other than acetaldehyde is reacted in the method of the third step, a 5-substituted thiazolyl compound results. If a halomethyl ketone is reacted in the method of the third step, a 4-substituted thiazolyl compound results, and, if an α-haloketone other than a halomethyl ketone is reacted, a 4- and 5-substituted thiazolyl compound is the product.

The products of the present invention are therapeutic agents useful in the field of antihistaminics.

The following examples are given to illustrate the practice of the present invention but are not to be construed as limiting.

*Example 1.—Preparation of N-(2-dimethylaminoethyl)-N-(benzyl)-cyanamide*

Cyanogen bromide was prepared by gradually adding a solution of 6.8 grams (0.1 mole) of potassium cyanide in 25 milliliters of water to a mixture of 16 grams (0.1 mole) of bromine and 25 grams of ice. After standing for about ten minutes at zero to five degrees centigrade, the resulting cyanogen bromide solution was added with constant stirring to a mixture of 17.8 grams (0.1 mole) of N,N-dimethyl-N'-benzyl-ethylenediamine, 50 milliliters of ether and 25 grams of ice, over a period of 15 minutes at zero to ten degrees centigrade. After all the cyanogen bromide was added, the reaction mixture was stirred for ten minutes more. Ten milliliters of 40 degrees Bé. sodium hydroxide solution were added to liberate the cyanamide from its hydrobromide. The free base was extracted with a total of 200 milliliters of ether, the ether extract washed with 25 milliliters of saturated sodium sulfate solution and then dried over anhydrous sodium sulfate. After removal of the solvent, a practically quantitative yield, 20.5 grams, of N-(2-dimethylaminoethyl)-N-(benzyl)-cyanamide was obtained as a pale yellow viscous liquid.

*Example 2.—Preparation of 1-(2-dimethylaminoethyl)-1-(benzyl)-2-thiourea from N-(2-dimethylaminoethyl)-N-(benzyl)-cyanamide*

A solution of 20.3 grams (0.1 mole) of N-(2-dimethylaminoethyl)-N-(benzyl)-cyanamide and five milliliters of triethylamine in 40 milliliters of alcohol was saturated with hydrogen sulfide at ten degrees centigrade for a period of two and one-half hours. After this time, crystallization started and within a few minutes the reaction mixture was substantially a solid mass of crystals. The reaction mixture was allowed to stand at five degrees centigrade for 24 hours and then the crystalline mass was broken up, filtered off, and the filter cake washed with alcohol. Several more crops of crystals were obtained on concentrating the mother liquors bringing the total yield of white crystalline product up to 18.5 grams or 78 percent of the theoretical yield. After recrystallization from alcohol, 16.7 grams or a 70 percent yield of pure 1-(2-dimethylaminoethyl)-1-(benzyl)-2-thiourea was obtained in the form of fine white needles melting at 106–107 degrees centigrade. The hydrochloride melts at 173–174 degrees centigrade. The absorption spectrum of the free base in methanol showed a maximum at 248 mu., molecular extinction 14240 and a minimum at 230 mu. molecular extinction 5460.

*Example 3.—Preparation of N,N-dimethyl-N'-benzyl-N'-(2-thiazolyl)-ethylenediamine monohydrochloride*

A mixture of 5.0 grams (0.021 mole) of 1-(2-dimethylaminoethyl)-1-(benzyl)-2-thiourea, 3.2 grams (0.021 mole) of diethylchloroacetal and 3.6 grams (0.037 mole) of concentrated hydrochloric acid was heated at 100 degrees centigrade, for one hour. After cooling the reaction mixture to 25 degrees centigrade, five milliliters of 40 degrees Bé. sodium hydroxide solution were added to give a strongly alkaline solution. The basic compound was extracted with a total of 30 milliliters of ether, the ether extract washed with five milliliters of saturated sodium sulfate solution and then dried over anhydrous sodium sulfate. All the solvent was removed by distillation in vacuo. The remaining 5.5 grams of viscous liquid was converted to the monohydrochloride by dissolving it in a mixture of five milliliters of anhydrous ethyl alcohol and twenty milliliters of ethyl acetate and subsequently adding a solution of 0.76 gram (0.021 mole) of hydrogen chloride in 5.5 milliliters of anhydrous ethyl alcohol. The mixture was heated to dissolve the crystalline precipitate and then allowed to cool slowly. The crystalline product was filtered off, washed with ethyl acetate and dried at fifty degrees centigrade. A second crop of crystals was obtained by concentrating the mother liquors bringing the total yield up to 5.1 grams or 81.8 percent of the theoretical.

After recrystallization from twenty milliliters of n-butanol there were obtained 4.6 grams of pure N,N-dimethyl-N'-benzyl-N'-(2-thiazolyl)-ethylenediamine monohydrochloride, a fine light tan crystalline powder. It melted at 176–177 degrees centigrade and its absorption spectrum in methanol showed a maximum at 264 mu. molecular extinction 8790 and a minimum at 230 mu. molecular extinction 2384.

*Example 4.—Preparation of N-(4-methoxybenzyl)-2-aminoethanol*

Ninety-one grams (1.5 mole) of 2-aminoethanol were added with rapid stirring during a period of five minutes to a solution of 204 grams (1.5 mole) of methoxybenzaldehyde in 1500 milliliters of specially denatured 3A alcohol at 25 degrees centigrade. After standing at room temperature for one-half hour, 4.0 grams of a palladium-carbon catalyst (five percent palladium) was added and the mixture agitated at 55–60 degrees centigrade under hydrogen at atmospheric pressure. After three hours, when the theoretical amount of hydrogen, 33.6 liters, had been absorbed, the solution was filtered and the alcohol removed by distillation. The oily residue was distilled in vacuo and the fraction distilling at 129–131 degrees centigrade at 0.26 millimeter collected separately. This fraction weighed 222 grams, and was found to be practically pure N-(4-methoxybenzyl)-2-aminoethanol having a specific gravity of 1.1016 at 25 degrees centigrade, refractive index of $N_D^{25}$ 1.5430 and a purity by potentiometric titration to pH 5.0 of 99.5 percent. This compound may be readily converted to the diamine derivative by reaction in a conventional manner with a suitable amine.

*Example 5.—Preparation of N-(2-dimethylaminoethyl)-N-(4-methoxybenzyl)-cyanamide*

Cyanogen bromide was prepared by gradually adding a solution of 10.3 grams (0.15 mole) of potassium cyanide in 35 milliliters of water to a mixture of 24 grams (0.15 mole) of bromine and 35 grams of ice. After standing for about ten minutes at zero to five degrees centigrade, the resulting cyanogen bromide solution was added with constant stirring to a mixture of 31.2 grams (0.15 mole) of N,N-dimethyl-N'-(4-methoxybenzyl)-ethylenediamine, 70 milliliters of ether and 35 grams of ice, during a period of fifteen minutes at zero to ten degrees centigrade. After all the cyanogen bromide was added, the reaction mixture was stirred for one-half hour more and then 15 milliliters of 40 degrees Bé. sodium hydroxide solution was added to liberate the cyanamide from its hydrobromide. The free base was extracted with a total of 300 milliliters of ether, the clear ether extract washed with 25 milliliters of saturated sodium sulfate solution and then dried over anhydrous sodium sulfate. After removal of the solvent there remained 32.7 or a 93.4 percent yield of N-(2-dimethylaminoethyl)-N-(4-methoxybenzyl)-cyanamide as a pale yellow viscous liquid.

*Example 6.—Preparation of 1-(2-dimethylaminoethyl) - 1 - (4 - methoxybenzyl) - 2 - thiourea from N-(2-dimethylaminoethyl)-N-(4-methoxybenzyl)-cyanamide*

A solution of 32.7 grams (0.14 mole) of N-(2-dimethylaminoethyl) - N - (4 - methoxybenzyl)-cyanamide and seven milliliters of triethylamine in 70 milliliters of alcohol was saturated with hydrogen sulfide at ten degrees centigrade for a period of two hours. The clear yellow reaction mixture was allowed to stand at five degrees centigrade for 48 hours and then the product which crystallized filtered off, washed with alcohol and dried at 50 degrees centigrade. Two more crops of crystals were obtained by concentrating the mother liquors bringing the total yield of the white crystalline product up to 29.5 grams or 79 percent of the theoretical yield. After recrystallization from alcohol, 26.3 grams or a seventy percent yield of pure 1-(2-dimethylaminoethyl) - 1 - (4 - methoxybenzyl) - 2 - thiourea was obtained in the form of coarse white crystals melting at 78–81 degrees centigrade. The absorption spectrum of the free base in methanol shows a maximum at 249 mu., molecular extinction 15,640 and a minimum at 238 mu. molecular extinction 11,500.

*Example 7.—Preparation of N,N-dimethyl-N'-(4 - methoxybenzyl) - N' - (2 - thiazolyl) - ethylenediamine monohydrochloride from 1-(4 - methoxybenzyl) - 1 - (2 - dimethylaminoethyl)-2-thiourea*

Twenty grams (0.075 mole) of 1-(4-methoxybenzyl) - 1 - (2 - dimethylaminoethyl) - 2-thiourea and 11.4 grams (0.075 mole) of diethylchloroacetal were mixed together at 25 degrees centigrade and 8.75 milliliters (0.095 mole) of concentrated hydrochloric acid added with constant stirring over a period of five minutes. The reaction mixture was then stirred at 95–100 degrees centigrade for one and one-half hours. It was cooled to 25 degrees centigrade, 15 milliliters of 40 degrees Bé. sodium hydroxide solution added and the mixture extracted with several portions of ether using a total of 200 milliliters. The ether extract was thoroughly dried over anhydrous sodium sulfate and the solvent removed by distillation. The light brown oily residue, crude N,N-dimethyl - N' - (4 - methoxybenzyl) - N' - (2-thiazolyl)-ethylenediamine weighed 22 grams. The crude gas was dissolved in 20 milliliters of alcoholic hydrogen chloride containing 2.74 grams (0.075 mole) of hydrogen chloride, 50 milliliters of ethyl acetate added, and the mixture heated to boiling to redissolve the crystalline precipitate. On cooling to 25 degrees centigrade, the monohydrochloride separated as fine, light tan crystals. Two additional crops of crystals were obtained by concentrating the mother liquors, bringing the total yield up to 20.0 grams, or 81.2 percent of the theoretical yield. After recrystallization from a mixture of anhydrous alcohol and ethyl acetate (1:2), 17.7 grams or a 72.2 percent yield of pure N,N-dimethyl-N'-(4-methoxybenzyl)-N'-(2-thiazolyl)-ethylenediamine monohydrochloride was obtained in the form of fine, light tan crystals. The product is very soluble in water, alcohol and n-butanol and melts at 167.5–168 degrees centigrade. Its absorption spectrum shows a maximum at 228 mu. molecular extinction 11,480, a minimum at 243 mu. molecular extinction 4428, and a second maximum at 267 mu. extinction 9709.

*Example 8.—Preparation of N - (4 - methoxybenzyl)-1-amino-2-propanol*

One hundred fifty-six and six tenths grams (1.0 mole) of 4-methoxybenzyl chloride were added dropwise during two hours with rapid stirring, to a mixture of 305 grams (5 moles) of 1-amino-2-propanol and 150 milliliters of specially denatured 2B alcohol at 62–67 degrees centigrade. After stirring at 62–67 degrees centigrade for one hour, the reaction mixture was cooled to 25 degrees centigrade and 85 milliliters of 40 degrees Bé. sodium hydroxide solution added. The mixture was stirred for one-half hour more, filtered to remove the sodium chloride and then distilled at 50 millimeters pressure until the temperature of the vapor reached 125 degrees centigrade, and then at 0.1 millimeter pressure. The fraction distilling from 126–130 degrees centigrade at 0.1 millimeter weighed 131 grams and was found to be practically pure N - (4 - methoxybenzyl) - 1-amino-2-propanol, an almost colorless viscous liquid, having a refraction index of $N_D^{25}$ 1.5315, and a purity by potentiometric titration to pH 5.0 and 100.3 percent.

This compound may then be converted to a corresponding diamine, by reaction with a suitable amine in any convenient manner which will be apparent to one skilled in the art.

*Example 9.—Preparation of N - (4 - methoxybenzyl)-2-chloropropylamine hydrochloride*

A solution of 130 grams (0.666 mole) of N-(p-methoxybenzyl)-1-amino-2-propanol in 800 milliliters of ethylene dichloride was saturated with dry hydrogen chloride while stirring rapidly at 40 degrees centigrade. The mixture was then heated to 60 degrees centigrade and 91 grams (0.766 mole) of thionyl chloride added dropwise during five hours, during which time the temperature of the reaction mixture was allowed to rise to 73 degrees centigrade. After all the thionyl chloride was added, the reaction mixture was stirred for one hour at 73–75 degrees centigrade. The excess thionyl chloride and about half of the ethylene dichloride were then removed by distillation under vacuum. The residue in the distilling flask was cooled to 20 degrees centigrade, a crystalline product filtered off, washed with cold ethylene dichloride and dried at 50 degrees centigrade. The dry product was recrystallized from a mixture of three parts of anhydrous alcohol and one part of ethyl acetate. A total of 150 grams or a 90 percent yield of fine, white crystals were obtained, which had a melting point of 167–170 degrees centigrade and a total chlorine content of 28.52 percent (theoretical—28.35 percent).

*Example 10.—Preparation of $N^2,N^2$-dimethyl-$N^1$-benzyl-1,2-propanediamine*

One hundred and ten grams (0.5 mole) of N- benzyl-2-chloropropylamine hydrochloride were added over a period of 15 minutes with rapid stirring to a mixture of 386 milliliters (2.0 mole) of 25 percent aqueous dimethylamine solution and 350 milliliters of alcohol maintained at 25 degrees centigrade. After the solution was clear, which required about five minutes after the last addition, it was allowed to stand at room temperature for 24 hours. The solution was concentrated to 200 milliliters by distillation in vacuo and then cooled to 25 degrees centigrade. A saturated aqueous solution of 50 grams of sodium hydroxide was gradually added and the free base extracted with ether. The ether extract was dried over potassium carbonate, the solvent removed by distillation, and the oily residue distilled in vacuo. The fraction distilling at 95–96 degrees centigrade at 3.0 millimeters was collected separately. This fraction weighed 48 grams, representing a fifty percent yield of pure $N^2,N^2$ - dimethyl - $N^1$ - benzyl - 1,2 - propanediamine. It is a colorless liquid having the following physical properties: Specific gravity 0.9276 at 25 degrees centigrade, $N_D^{25}$ 1.5010.

The dihydrochloride was prepared by adding the theoretical amount of alcoholic hydrogen chloride to a concentrated solution of the base in anhydrous alcohol, adding ether and allowing the salt to crystallize out at five degrees centigrade. The resulting white crystalline $N^2,N^2$-dimethyl-$N^1$-benzyl-1,2-propanediamine dihydrochloride melted at 172–173 degrees centigrade and on analysis was found to contain 26.49 percent chlorine (theoretical 26.74 percent).

*Example 11.—Preparation of $N^2$, $N^2$-dimethyl-$N^1$- (4-methoxybenzyl)-1,2-propanediamine*

One hundred and twenty-five grams (0.5 mole) of N-(4-methoxybenzyl) - 2 - chloropropylamine hydrochloride was added over a period of fifteen minutes with rapid stirring to a mixture of 386 milliliters (2.0 moles) of 25 percent aqueous dimethylamine solution and 375 milliliters of alcohol maintained at 25 degrees centigrade. After the solution was clear, which required about five minutes after the last addition, it was allowed to stand at room temperature for 24 hours. The solution was concentrated to 300 milliliters by distillation in vacuo and then cooled to 25 degrees centigrade. A saturated aqueous solution of fifty grams of sodium hydroxide was gradually added and the free base extracted with ether. The ether extract was dried over potassium carbonate, the solvent removed by distillation and the oil residue distilled in vacuo. The fraction distilling at 123–126 degrees centigrade at 1.5 millimeters was collected separately. This fraction weighed 55.2 grams, representing a 49.6 percent yield of $N^2,N^2$-dimethyl-$N^1$-(4-methoxybenzyl)-1,2-propanediamine. It is a colorless liquid having the following physical properties: Specific gravity 0.9670 at 25 degrees centigrade, $N_D^{25}$ 1.50.68.

On potentiometric titration to pH 3.50 with standard hydrochloric acid 97.4 percent of the theoretical amount of acid was consumed.

The dihydrochloride was prepared by adding the theoretical amount of alcoholic hydrogen chloride to a solution of the base in anhydrous alcohol, heating to obtain complete solution of the precipitated salt and then allowing it to crystallize at room temperatre. The resulting white, crystalline, $N^2,N^2$ - dimethyl - $N^1$ - (p - methoxybenzyl) - 1,2 - propanediamine dihydrochloride melted at 207–208 degrees centigrade and on analysis was found to contain 24.06 percent chlorine (theoretical 24.02 percent chlorine).

*Example 12.—Preparation of N-(2-dimethylaminopropyl)-N-(4-methoxybenzyl)-cyanamide*

Cyanogen bromide was prepared by gradually adding a solution of 22.4 grams (0.33 mole) of potassium cyanide in 80 milliliters of water to a mixture of 52.6 grams (0.33 mole) of bromine and 200 grams of ice. After standing for about ten minutes at zero to five degrees centigrade, the resulting cyanogen bromide solution was added to a mixture of 73 grams (0.33 mole) of $N^2,N^2$-dimethyl-$N^1$-(4-methoxybenzyl) - 1,2 - propanediamine, 175 milliliters of ether and 225 grams of ice, during fifteen minutes at zero to five degrees centigrade with constant stirring. After all the cyanogen bromide was added, the reaction mixture was stirred for one-half hour more and then 34 milliliters of 40 degrees Bé. sodium hydroxide solution were added to liberate the cyanamide from its hydrobromide. The free base was extracted with a total of 400 milliliters of ether. The ether extract was washed with 50 milliliters of saturated sodium sulfate solution and then dried over anhydrous sodium sulfate. After removal of the solvent, there remained 80 grams or a 98.5 percent yield of N-(2-dimethylaminopropyl)-N-(4-methoxybenzyl) - cyanamide as a bright orange colored viscous liquid.

*Example 13.—Preparation of 1-(2-dimethylaminopropyl)-1-(4-methoxybenzyl)-2-thiourea*

A solution of 80 grams (0.323 mole) of N-(2-dimethylaminopropyl) - N - (4-methoxybenzyl) - cyanamide in 120 milliliters of alcohol and 40 milliliters of 28 percent ammonium hydroxide was saturated with hydrogen sulfide at ten degrees centigrade for a period of six hours. The clear yellow reaction mixture was allowed to stand at five degrees centigrade for 48 hours and then the product which crystallized out was filtered off, washed with alcohol and dried at 50 degrees centigrade. Another small crop of crystals was obtained by concentrating the mother liquors bringing the total yield of the white crystalline product up to 72 grams or 79 percent of the theoretical yield. After recrystallization from alcohol, 66.9 grams or a 73.7 percent yield of pure 1-(2-dimethylaminopropyl)-1-(4 - methoxybenzyl)-2-thiourea was obtained in the form of coarse white crystals melting at 107.5–108.5 degrees centigrade.

*Example 14.—Preparation of $N^2,N^2$-dimethyl-$N^1$- (4-methoxybenzyl)-$N^1$-(2-thiazolyl)-1,2 - propanedamine monohydrochloride*

Forty-six and nine-tenths grams (0.166 mole) of 1-(2-dimethylaminopropyl) - 1 - (4-methoxybenzyl)-2-thiourea and 25.8 grams (0.166 mole) of diethylchloroacetal were mixed together at 25 degrees centigrade, 20.8 milliliters (0.25 mole) of concentrated hydrochloric acid added and the mixture stirred at 90–95 degrees centigrade for one hour. The reaction mixture was cooled to 25 degrees centigrade, 40 milliliters of 40 degrees Bé. sodium hydroxide solution added, and the base extracted with a total of 500 milliliters of ether. The ether extract was dried over anhydrous sodium sulfate and all the solvent removed by distillation. The light brown oily residue, which weighed 51.9 grams was dissolved in 50 milliliters of anhydrous alcohol and a solution of 30.4 milliliters of alcoholic hydrogen chloride containing 6.08 grams (0.166 mole) of hydrogen chloride added. All the solvent was removed by distillation under vacuum and the residue crystallized from methylethyl ketone. The resulting pure $N^2,N^2$-dimethyl-$N^1$-(4-methoxybenzyl)-$N^1$-(2-thiazolyl)-1,2-propanediamine monohydrochloride weighed 30.5 grams and melted at 124–125 degrees centigrade.

Sulfur content 9.30 percent (theoretical 9.38 percent).

*Example 15.—Preparation of N-(3,4-dimethoxybenzyl)-2-aminoethanol*

One hundred and thirty-six grams (0.82 mole) of veratraldehyde were added to a solution of 92 grams (1.5 moles) of 2-aminoethanol and 230 milliliters of 90 percent formic acid and the resulting mixture distilled very slowly. After five hours, the temperature of the reaction mixture had reached 190 degrees centigrade. Distillation was continued for another three hours, the temperature finally reaching 195 degrees centigrade. A total of 148 milliliters of distillate was obtained, consisting mainly of formic acid, water, a little 2-aminoethanol and only a trace of veratraldehyde. The reaction mixture was allowed to stand overnight at room temperature and then a solution of 40 milliliters of water in 175 milliliters of concentrated hydrochloric acid was added. After heating at 105–108 degrees centigrade for one hour, the reaction mixture was cooled to 25 degrees centigrade, diluted with 150 milliliters of water and extracted with 250 milliliters of ether to remove unchanged veratraldehyde and other ether soluble by-products. The ether extracted reaction mixture was made strongly alkaline by the careful addition of 170 grams of solid potassium hydroxide and then extracted with several portions of n-butanol, using 400 milliliters in all. The n-butanol extract was dried over anhydrous sodium sulfate, the solvent removed by distillation in vacuo at 15 millimeters and the residue fractionated in vacuo at 0.5 millimeter. The fraction distilling at 158–159 degrees centigrade was collected separately. This fraction was found to be practically pure N-(3,4-dimethoxybenzyl)-2-aminoethanol and weighed 94 grams, representing a yield of 54.2 percent based on the veratraldehyde. It was obtained as a colorless, viscous liquid which solidified to a white crystalline mass after standing at room temperature for 24 hours. On potentiometric titration to pH 5.1 with standard hydrochloric acid, 100.5 percent of the theoretical amount of hydrochloric acid was consumed.

The hydrochloride was prepared by adding the theoretical amount of alcoholic hydrogen chloride to a concentrated solution of the base in anhydrous alcohol, adding an equal volume of ether and allowing the salt to crystallize. After drying in vacuo at 80 degrees centigrade over phosphorous pentoxide, the N-(3,4-dimethoxybenzyl)-2-aminoethanol hydrochloride, white, needle-shaped crystals, melted at 110–111 degrees centigrade and on analysis was found to contain 14.37 percent of chlorine (theoretical 14.31 percent chlorine).

*Example 16.—Preparation of N-(3,4-dimethoxybenzyl)-2-chloroethylamine hydrochloride*

A solution of 103 grams (0.49 mole) of N-(3,4-dimethoxybenzyl)-2-aminoethanol in 500 milliliters of ethylene dichloride maintained at 30–40 degrees centigrade was saturated with dry hydrogen chloride with rapid stirring for a period of one hour. The reaction mixture was then warmed to 60 degrees centigrade and 71.5 grams (0.60 mole) of thionyl chloride added dropwise over a period of five hours with rapid stirring. The temperature was allowed to rise gradually to about 73 degrees centigrade at the completion of the addition of thionyl chloride. The mixture was stirred at 73–78 degrees centigrade for one-half hour more, the heat then turned off and the reaction mixture allowed to stand overnight without stirring. It was then concentrated to 250 milliliters by distillation, cooled to 25 degrees centigrade and the crystalline product filtered off. The crystalline product was washed with ethylene dichloride and then dried at 60 degrees centigrade. Another small crop of crystalline material was obtained by concentrating the mother liquors, bringing the total amount of crude product up to 114 grams, or an 87 percent yield.

By recrystallization from anhydrous alcohol, 108 grams or an 82.5 percent yield of pure N-(3,4-dimethoxybenzyl)-2-chloroethylamine hydrochloride was obtained as a fine, almost white, crystalline powder melting at 187–188.5 degrees centigrade.

Analysis: Chlorine 26.68 percent (theoretical 26.65 percent).

*Example 17.—Preparation of N,N-dimethyl-N'-(3,4-dimethoxybenzyl)-ethylenediamine*

Seventy-nine and eight-tenths grams (0.3 mole) of N-(3,4-dimethoxybenzyl)-2-chloroethylamine hydrochloride were added portionwise over a period of fifteen minutes, with rapid stirring, to a mixture of 290 milliliters (1.5 moles) of 25 percent aqueous dimethylamine solution and 200 milliliters of alcohol. When the addition was complete, the temperature was gradually raised to 60 degrees centigrade over a period of one-half hour, held at this point for one hour more and the reaction mixture concentrated to 175 milliliters by distillation in vacuo. The concentrated reaction mixture was cooled to 25 degrees centigrade and a saturated aqueous solution of 35 grams of sodium hydroxide added gradually with constant stirring and cooling in a water bath. The mixture was extracted with 600 milliliters of n-butanol, the n-butanol extract washed with 25 milliliters of saturated sodium sulfate solution and then dried over anhydrous sodium sulfate. The solvent was removed by distillation in vacuo. The light-brown, oily residue which resulted was dissolved in 400 milliliters of ether and filtered from the resinous precipitate.

The ether was removed by distillation and the pale yellow oily residue, 68.6 grams, distilled in vacuo. The fraction distilling at 126.5 to 127.5 degrees centigrade at 0.3 millimeter was collected separately. This fraction was found to be pure N,N-dimethyl-N'-(3,4-dimethoxybenzyl)-ethylenediamine and weighed 58.5 grams which is an 81.9 percent yield based on the N-(3,4-dimethoxybenzyl)-2-chloroethylamine hydrochloride used. It is a clear, colorless liquid having the following physical properties: Specific gravity 1.0322 at 25 degrees centigrade, $N_D^{25}$ 1.5222.

Purity by potentiometric titration to pH 3.78 with hydrochloric acid was found to be 99.7 percent.

The dihydrochloride was prepared by adding the theoretical amount of alcoholic hydrogen chloride to a solution of the base in anhydrous alcohol. After recrystallizing the precipitated dihydrochloride from alcohol it melted at 215–215.5 degrees centigrade.

Analysis of the dihydrochloride of N,N-dimethyl-N'-(3,4-dimethoxybenzyl)-ethylenediamine yielded: carbon 49.89 percent (theoretical 50.16 percent), hydrogen 7.81 percent (theoretical 7.77 percent), nitrogen 8.88 percent (theoretical 9.00 percent), chlorine 22.75 percent (theoretical 22.79 percent).

*Example 18.—Preparation of N-(2-dimethylaminoethyl) - N - (3,4-dimethoxybenzyl) -cyanamide*

Cyanogen bromide was prepared by gradually adding a solution of 13.6 grams (0.2 mole) of potassium cyanide in 50 milliliters of water to a mixture of 32 grams (0.2 mole) of bromine and 100 grams of ice. After standing for about fifteen minutes at zero to five degrees centigrade, the resulting cyanogen bromide solution was added over a period of fifteen minutes to a mixture of 47.7 grams (0.2 mole) of N,N-dimethyl-N'-(3,4-dimethoxybenzyl) - ethylenediamine, 150 milliliters of ether and 150 grams of ice maintained at a temperature between zero and five degrees centigrade with constant stirring. After all the cyanogen bromide was added, the reaction mixture was stirred for one-half hour more and then 32 milliliters of 40 degrees Bé. sodium hydroxide solution was added to liberate the cyanamide from its hydrobromide. The free base was extracted with a total of 500 milliliters of n-butanol. The n-butanol-ether extract was washed with 25 milliliters of saturated sodium sulfate solution and subsequently dried over anhydrous sodium sulfate. After removal of the solvent by distillation in vacuo, there remained 49.4 grams of a 94 percent yield of N-(2-dimethylaminoethyl)-N - (3,4 - dimethoxybenzyl)-cyanamide as a pale yellow viscous liquid.

*Example 19.—Preparation of 1 - (2 - dimethylaminoethyl) - 1 - (3,4 - dimethoxybenzyl)-2-thiourea*

A solution of 49.4 grams (0.188 mole) of N-(2-dimethylaminoethyl) - N - (3,4 - dimethoxybenzyl)-cyanamide in 80 milliliters of alcohol and 25 milliliters of 28 percent ammonium hydroxide was saturated at a temperature of five to ten degrees centigrade with hydrogen sulfide for a period of two and one-half hours. The reaction mixture was allowed to stand in the refrigerator overnight, after which time all the solvent was removed by distillation in vacuo. The residue was mixed with 50 milliliters of benzene and the mixture again distilled to remove the last traces of water. After dissolving the residue in 150 milliliters of anhydrous alcohol, 25 milliliters of anhydrous ether were added and the solution allowed to stand in the refrigerator to crystallize. After 24 hours the crystalline product was filtered off, washed with ether and dried at 50 degrees centigrade. Another small crop of crystals was obtained by concentrating the mother liquor, bringing the total yield up to 47.7 grams, or 85.5 percent of the theoretical. After recrystallizing from anhydrous alcohol, 41 grams or a 73.5 percent yield of pure 1-(2-dimethylaminoethyl)-1-(3,4-dimethoxybenzyl)-2-thiourea was obtained in the form of a fine, light buss, crystalline powder melting at 107.5–108 degrees centigrade. On analysis it was found to contain 10.71 percent of sulfur (theoretical 10.78 percent sulfur).

*Example 20.—Preparation of N,N-dimethyl-N'-(3,4 - dimethoxybenzyl) - N' - (2-thiazolyl)-ethylenediamine monohydrochloride*

Twenty-nine and seven-tenths grams (0.10 mole) of 1 - (2 - dimethylaminoethyl) - 1 - (3,4-dimethoxybenzyl)-2-thiourea and 15.5 grams (0.10 mole) of diethylchloroacetal were mixed together at 25 degrees centigrade. 12.5 milliliters (0.15 mole) of concentrated hydrochloric acid were then added over a period of five minutes with constant stirring. The reaction mixture was stirred at 90–95 degrees centigrade for two hours. It was then cooled to 25 degrees centigrade, 25 milliliters of 40 degrees Bé. sodium hydroxide solution added and the mixture extracted with 350 milliliters of ether. The ether extract was dried over anhydrous sodium sulfate, and all the solvent removed by distillation. The brown, oily residue, which weighed 31.8 grams, was dissolved in 20 milliliters of specially denatured 2B anhydrous alcohol and 19.8 milliliters of alcoholic hydrogen chloride containing 3.65 grams (0.10 mole) of hydrogen chloride added, followed by 75 milliliters of 99 percent ethyl acetate. The solution was allowed to stand at five degrees centigrade for about sixteen hours, then the crystalline product was filtered off, washed with ethyl acetate and dried at 50 degrees centigrade. Two more crops of crystals were obtained by concentrating the mother liquors, bringing the total yield of crude product up to 21.3 grams or 59 percent of theory. After recrystallization from a mixture of ethyl acetate and anhydrous alcohol in the ratio 2:1, the pure N,N-dimethyl-N'(3,4-dimethoxybenzyl) - N' - (2-thiazolyl)-ethylenediamine monohydrochloride was obtained as fine, light tan crystals melting at 149–150 degrees centigrade, corrected.

Analysis: Sulfur 8.94 percent (theoretical 8.96 percent).

*Example 21.—Preparation of N-(4-chlorobenzyl)-2-aminoethanol*

Four hundred and twenty grams (3.0 moles) of 4-chlorobenzaldehyde was added to a mixture of 366 grams (6.0 moles) of 2-aminoethanol and 790 milliliters (15.5 moles) of 90 percent formic acid. The mixture was distilled slowly over a period of eight hours. During this time, about 535 milliliters of a mixture of water and formic acid distilled over and the temperature of the reaction mixture gradually rose to 200 degrees centigrade. After this temperature was reached, practically no more distillate was obtained. The heat was turned off, the reaction mixture cooled to 25 degrees centigrade, 700 milliliters of concentrated hydrochloric acid and 200 milliliters of water added and the mixture heated to 100–105 degrees centigrade for one and one-half hours. It was cooled to 25 degrees centigrade, diluted with 200 milliliters of water and extracted with 800 milliliters of benzene to remove acid insoluble by-products. The mixture was then made alkaline by the addition of 1350 milliliters of 40 degrees Bé. sodium hydroxide solution and the liberated base extracted with ether. The ether extract was washed with water, dried over anhydrous potassium carbonate and all the solvent removed by distillation. The oily residue was distilled under vacuum and the fraction boiling at 106–108 degrees centigrade at 0.12 millimeter collected separately. This fraction weighed 368 grams and was found to be practically pure N-(4-chlorobenzyl)-2-aminoethanol, a colorless viscous liquid, specific gravity 1.1810 at 25 degrees centigrade, $N_D^{25}$ 1.5540, chlorine by analysis 19.06 percent (theoretical 19.10 percent).

The hydrochloride of the base was prepared as follows:

Thirty-seven grams of the base were dissolved in 50 milliliters of anhydrous ethyl alcohol and 32 milliliters of alcoholic hydrochloric acid (100 milliliters=23.3 grams HCl) added. The mixture was heated to dissolve the crystalline precipitate and then allowed to cool slowly. The crystalline product was filtered off and recrystallized from n-propanol. The dry product weighed 32.4 grams and consisted of fine white glistening scales. Melting point 171–172 degrees centigrade corrected.

Chlorine by analysis: Total chlorine 31.63 percent (theoretical 31.93 percent). Chlorine present as HCl salt 16.04 percent (theoretical 15.96 percent).

*Example 22.—Preparation of N-(4-chlorobenzyl)-2-chloroethylamine hydrochloride*

A solution of 325 grams (1.75 moles) of N-(4-chlorobenzyl)-2-aminoethanol in 2400 milliliters of ethylene dichloride was saturated with dry hydrogen chloride while stirring rapidly at 35–40 degrees centigrade. The mixture was then heated to 60 degrees centigrade and the dropwise addition of 250 grams (2.1 moles) of thionyl chloride started. The temperature was gradually increased so that at the end of two hours the reaction mixture was boiling gently. The addition of the thionyl chloride required a total of five hours. Stirring at reflux temperature was continued for two hours longer, then the heat was turned off, the stirrer stopped and the reaction mixture allowed to stand overnight. The excess thionyl chloride was removed by distillation and the reaction mixture concentrated to about 1500 milliliters. It was cooled to 20 degrees centigrade, the crystalline product filtered off, washed with ethylene dichloride and dried at 50 degrees centigrade. Another small crop of crystals was obtained by concentrating the mother liquor to about 300 milliliters. Both crops of crystals, 383 grams in all, were combined and recrystallized from 2500 milliliters of specially denatured 3A alcohol. The recrystallized product N-(4-chlorobenzyl)-2-chloroethylamine hydrochloride weighed 355 grams. It was obtained as a fine white crystalline powder. Melting point 216–217 degrees centigrade corrected.

Analysis: Total chlorine 43.90 percent (theoretical 44.22 percent).

Chlorine present as HCl salt 14.79 percent (theoretical 14.74 percent).

*Example 23.—Preparation of N,N-dimethyl-N'-(4-chlorobenzyl)-ethylenediamine*

Three hundred and twenty-one grams (1.33 moles) of N-(4-chlorobenzyl)-2-chloroethylamine hydrochloride was added portionwise, during ten minutes, with rapid stirring, to a mixture of 1200 milliliters (3.36 moles) of aqueous dimethylamine solution and 250 milliliters of alcohol. At the start the reaction mixture was at 25 degrees centigrade but fifteen minutes after the addition was complete, the temperature was 45 degrees centigrade. Stirring was discontinued and the clear reaction mixture allowed to stand at room temperature for 48 hours. It was then concentrated to 1000 milliliters by distillation under vacuum. The concentrated solution was cooled to 25 degrees centigrade and the base liberated by the addition of 300 milliliters of 40 degrees Bé. sodium hydroxide solution. The base was extracted with two 150 milliliter portions of ether, the extract dried over anhydrous potassium carbonate and the solvent removed by distillation. The oily residue was distilled under vacuum and the fraction distilling at 80–81 degrees centigrade and 0.05 millimeter collected separately. This fraction weighed 259 grams representing 91.7 percent yield of N,N-dimethyl-N'-(p-chlorobenzyl)-ethylenediamine. It is a clear colorless liquid having the following physical properties: Specific gravity 1.0519 at 25 degrees centigrade, $N_D^{25}$ 1.5210.

Analysis: Chlorine 16.73 percent (theoretical 16.67 percent).

The dihydrochloride was prepared by adding the theoretical amount of alcoholic hydrogen chloride to a ten percent solution of the base in anhydrous alcohol, heating the mixture to dissolve the precipitated salt and allowing it to crystallize at room temperature. After recrystallization from anhydrous alcohol, the N,N-dimethyl-N'-(4-chlorobenzyl)-ethylenediamine dihydrochloride was obtained in the form of fine, white, matted needles melting at 210–211 degrees centigrade corrected.

Analysis of the dihydrochloride:

Chlorine present as the dihydrochloride salt 24.69 percent (theoretical 24.83 percent).

Total chlorine 36.90 percent (theoretical 37.24 percent).

*Example 24.—Preparation of N-(2-dimethylaminoethyl)-N-(4-chlorobenzyl)-cyanamide*

Cyanogen bromide was prepared by gradually adding a solution of 78.2 grams (1.14 moles) of 95 percent potassium cyanide in 150 milliliters of water to a mixture of 182 grams (1.14 moles) of bromine and 570 grams of ice. After standing for about ten minutes at zero to five degrees centigrade, the resulting cyanogen bromide solution was added to a mixture of 221 grams (1.04 moles) of N,N-dimethyl-N'-(4-chlorobenzyl)-ethylenediamine, 520 milliliters of ether and 450 grams of ice over a period of fifteen minutes at zero to five degrees centigrade, with constant stirring. After all the cyanogen bromide was added, the reaction mixture was stirred for fifteen minutes longer, at zero to five degrees centigrade and then 120 milliliters of 40 degrees Bé. sodium hydroxide solution was added to liberate the cyanamide from its hydrobromide. The free base was extracted with a total of 1200 milliliters of ether, the ether extract washed with 50 milliliters of saturated sodium sulfate solution and then dried over anhydrous sodium sulfate. After removal of the solvent there remained 243 grams or a 98 percent yield of N-(2-dimethylaminoethyl)-N-(4-chlorobenzyl)-cyanamide as a viscous, orange colored liquid.

*Example 25.—Preparation of 1-(2-dimethylaminoethyl)-1-(4-chlorobenzyl)-2-thiourea from N-(2-dimethylaminoethyl)-N-(4-chlorobenzyl)-cyanamide*

A solution of 243 grams (1.022 moles) of N-(2-dimethylaminoethyl)-N-(4-chlorobenzyl)-cyanamide and 40 grams of anhydrous ammonia in 600 milliliters of 95 percent alcohol was saturated with hydrogen sulfide at five to ten degrees centigrade during three hours. The thick crystalline suspension was allowed to stand at five degrees centigrade for 24 hours and then the crystalline product filtered off, washed with cold alcohol and dried at 50 degrees centigrade. Another small crop of crystals was obtained by concentrating the mother liquor, bringing the total yield of crude product up to 259 grams, or 92 percent of the theoretical yield. After recrystallization from alcohol, the 1-(2-dimethylaminoethyl)-1-(4-chlorobenzyl)-2-thiourea was obtained in the form of fine white crystals melting at 119-120 degrees centigrade corrected.

Analysis: Sulfur 11.82 percent (theoretical 11.80 percent). Chlorine 12.93 percent (theoretical 13.05 percent).

The hydrochloride was prepared in almost quantitative yield by adding the theoretical amount of alcoholic hydrogen chloride to a 20 percent solution of the base in anhydrous alcohol and allowing the solution to stand in the refrigerator for four hours to crystallize. The hydrochloride of 1-(2-dimethylaminoethyl)-1-(4-chlorobenzyl)-2-thiourea was obtained in the form of fine white crystals melting at 177-177.5 degrees centigrade corrected.

Analysis of the hydrochloride: Sulfur 10.40 percent (theoretical 10.40 percent). Total chlorine 22.91 percent (theoretical 23.00 percent).

*Example 26.—Preparation of N,N-dimethyl-N'-(4 - chlorobenzyl) - N'-(2-thiazolyl)-ethylenediamine monohydrochloride*

Two hundred and twenty-two grams (0.70 mole) of 1-(2-dimethylaminoethyl)-1-(4-chlorobenzyl)-2-thiourea hydrochloride, 89 grams (0.70 mole) of 98 percent dimethylchloroacetal and 60 milliliters of concentrated hydrochloric acid were mixed at 25 degrees centigrade and then stirred at 75-82 degrees centigrade for two and one-half hours. The reaction mixture was cooled to 25 degrees centigrade, 210 milliliters of 40 degrees Bé. sodium hydroxide solution added and the base extracted with a total of 900 milliliters of benzene. The benzene extract was washed with two 50-milliliter portions of saturated sodium sulfate solution and then dried over anhydrous sodium sulfate. The dry benzene extract was diluted to 1000 milliliters with dry benzene and a solution of 25.6 grams (0.70 mole) of anhydrous hydrogen chloride in 100 milliliters of anhydrous alcohol added with stirring during ten minutes. The solution was allowed to stand at five degrees centigrade for several hours to crystallize. The crystalline product was filtered off, washed with benzene and dried at 50 degrees centigrade. On concentration of the mother liquor, three more small crops of crystals were obtained making the total yield of crude product 229 grams or 98 percent of the theoretical amount. After recrystallization from n-propanol there was obtained 205 grams or an 88 percent yield of pure N,N-dimethyl-N'-(4-chlorobenzyl) - N' - (2 - thiazolyl) - ethylenediamine monohydrochloride in the form of a fine, light tan crystalline powder melting at 156-157.5 degrees centigrade corrected.

Analysis: Sulfur 9.59 percent (theoretical 9.65 percent). Total chlorine 21.15 percent (theoretical 21.34 percent).

*Example 27.—Preparation of N-(2-thenyl)-2-aminoethanol*

A mixture of 140 grams (1.25 moles) of 2-thiophenealdehyde, 153 grams (2.5 moles) of 2-aminoethanol and 350 milliliters of ninety percent formic acid was distilled very slowly. The 2-thiophenealdehyde which distilled over with the formic acid and water was separated at intervals and returned to the reaction mixture. As the distillation progressed, the temperature of the reaction mixture gradually rose, reaching 176 degrees centigrade at the end of eight hours. The reaction mixture was allowed to cool to 25 degrees centigrade, 250 milliliters of concentrated hydrochloric acid and 200 milliliters of water added and the resulting solution heated to 100 to 105 degrees centigrade for two hours. It was cooled to room temperature, diluted with 200 milliliters of water and extracted with benzene to remove unchanged 2-thiophenealdehyde and other benzene soluble impurities. The benzene extracted acid solution was stirred with decolorizing carbon, filtered and then made strongly alkaline by the addition of 500 milliliters of 40 degrees Bé. sodium hydroxide solution. The oily base was extracted with n-butanol, the extract dried over anhydrous sodium sulfate and the solvent removed by distillation until the vapor temperature reached 45 degrees centigrade at 30 millimeter pressure. The crude residual product which weighed 152 grams was purified by distillation under vacuum. The fraction distilling at 84-85 degrees centigrade under 0.14 millimeter pressure was collected separately. The pure N-(2-thenyl)-2-aminoethanol weighed 113 grams and was obtained as a colorless, viscous liquid.

Specific gravity 1.1673 at 25 degrees centigrade, refractive index $N_D^{25}$ 1.5900, sulfur content 20.23 percent (theoretical 20.33 percent).

The hydrochloride was prepared by adding 2.5 milliliters of alcoholic hydrogen chloride (0.016 mole) to a solution of 2.35 grams (0.015 mole) of the pure base in five milliliters of ethylenedichloride. The mixture was heated to boiling and anhydrous alcohol added dropwise until solution was complete. After standing in the refrigerator for two hours, the crystalline product was filtered off and recrystallized from a mixture of ethylenedichloride and anhydrous alcohol. Pure N-(2-thenyl)-2-aminoethanol hydrochloride was obtained in the form of white needles, melting at 84-85 degrees centigrade, Sulfur content 16.46 percent (theoretical 16.55 percent). Chlorine content 18.29 percent (theoretical 18.31 percent).

*Example 28.—Preparation of N-(2-thenyl)-2-chloroethylamine hydrochloride*

A solution of 110 grams (0.7 mole) of N-(2-thenyl)-2-aminoethanol in 1200 milliliters of ethylene dichloride was saturated with dry hydrogen chloride while stirring rapidly at 35-40 degrees centigrade. The mixture was then heated to 60 degrees centigrade and the dropwise addition of 100 grams (0.84 mole) of thionyl chloride started. The temperature was gradually raised so that at the end of two hours the reaction mixture was boiling gently. The addition of the thionyl chloride required five hours. Stirring at reflux temperature was continued for two hours longer, then the heat was turned off, the stirrer stopped, and the reaction mixture allowed to stand overnight. It was then concentrated by distillation to reduce the volume to 500 milliliters. The mixture was cooled to 20 degrees centigrade, the crystalline product filtered off, washed with ethylene dichloride and dried at 50 degrees centigrade. Another small crop of crystals was obtained by concentration of the mother liquor to about 200 milliliters bringing the total yield of crude product up to 139 grams. The crude product on recrystallization from specially denatured 2B anhydrous alcohol yielded 106 grams of pure N-(2-thenyl)-2-chloroethylamine hydrochloride melting at 156-157 degrees centigrade.

Analysis: Chlorine 33.43 percent (theoretical 33.43 percent), sulfur 15.00 percent (theoretical 15.11 percent).

Example 29.—Preparation of N,N-dimethyl-N'-(2-thenyl)-ethylenediamine

Eighty-four and eight tenths grams (0.40 mole) of N-(2-thenyl)-2-chloroethylamine hydrochloride was added portionwise, during fifteen minutes, with rapid stirring, to a mixture of 370 milliliters (2.0 moles) of aqueous dimethylamine solution and 220 milliliters of specially denatured 3A alcohol. At the start, the reaction mixture was at 25 degrees centigrade but twenty minutes after the addition was complete, the temperature was 45 degrees centigrade. Stirring was discontinued and the reaction mixture allowed to stand at 25 degrees centigrade for 48 hours. It was then concentrated to about 300 milliliters by distillation under vacuum. The concentrated solution was cooled to 25 degrees centigrade, and the base liberated by the addition of 80 milliliters of 40 degrees Bé. sodium hydroxide solution. The base was extracted with three 100 milliliter portions of ether, the extract dried over anhydrous potassium carbonate and the solvent removed by distillation. The oily residue was distilled under vacuum and the fraction distilling at 60–61.5 degrees centigrade at 0.13 milliliter collected separately. This fraction weighed 61.2 grams, representing an 83.2 percent yield of N,N-dimethyl-N'-(2-thenyl)-ethylenediamine. It is a colorless liquid having the following physical constants: Specific gravity 1.0082 at 25 degrees centigrade, refractive index $N_D^{25}$ 1.5190. Analysis: sulfur 17.32 percent (theoretical 17.40 percent).

The dihydrochloride was prepared by adding the theoretical amount of alcoholic hydrogen chloride to a three percent solution of the base in specially denatured anhydrous 2B alcohol, heating the mixture to dissolve the precipitate and allowing it to crystallize. The crystalline product was filtered off, washed with anhydrous alcohol and dried at 50 degrees centigrade. The resulting pure N,N-dimethyl-N'-(2-thenyl)-ethylenediamine dihydrochloride was obtained in the form of white, glistening scales, melting at 199.5–201 degrees centigrade corrected.

Analysis of dihydrochloride: Chlorine 25.57 percent (theoretical 25.57 percent), sulfur 12.45 percent (theoretical 12.46 percent).

Example 30.—Preparation of N-(2-dimethylaminoethyl)-N-(2-thenyl)-cyanamide

Cyanogen bromide was prepared by gradually adding a solution of 26.8 grams (0.39 mole) of 95 percent potassium cyanide in 55 milliliters of water, to a mixture of 62.5 grams (0.39 mole) of bromine and 240 grams of ice. After standing for about ten minutes at zero to five degrees centigrade the resulting cyanogen bromide solution was added to a mixture of 66.4 grams (0.36 mole) of N,N-dimethyl-N'-(2-thenyl)-ethylenediamine, 200 milliliters of ether and 150 grams of ice during fifteen minutes at zero to five degrees centigrade with constant stirring. After all the cyanogen bromide was added, the reaction mixture was stirred for fifteen minutes longer at zero to five degrees centigrade and then 37 milliliters of 40 degrees Bé. sodium hydroxide solution was added to liberate the cyanamide from its hydrobromide. The free base was extracted with a total of 500 milliliters of ether, the ether extract washed with 25 milliliters of saturated sodium sulfate solution and then dried over anhydrous sodium sulfate. After removal of the solvent by distillation, there remained 69 grams or a 91.5 percent yield of N-(2-dimethylaminoethyl)-N-(2-thenyl)-cyanamide as a light orange colored oily liquid.

Example 31.—Preparation of 1-(2-dimethylaminoethyl)-1-(2-thenyl)-2-thiourea

A solution of 69 grams (0.33 mole) of N-(2-dimethylaminoethyl)-N-(2-thenyl)-cyanamide and ten grams of anhydrous ammonia in 200 milliliters of specially denatured 3A alcohol was saturated with hydrogen sulfide at five to ten degrees centigrade during two and one-half hours. The crystalline suspension was allowed to stand at five degrees centigrade for 24 hours. The crystalline product was then filtered off, washed with cold alcohol and dried at 50 degrees centigrade. On concentration of the mother liquor, a second and third crop of crystals were obtained making the total yield of crude product 68.5 grams or 79 percent of theory. After recrystallization from anhydrous alcohol, 60 grams or a 69 percent yield of pure 1-(2-dimethylaminoethyl)-1-(2-thenyl)-2-thiourea was obtained as large colorless crystals melting at 85–86 degrees centigrade.

Analysis: Sulfur 26.22 percent (theoretical 26.35 percent).

The hydrochloride was prepared in almost quantitative yield by adding the theoretical amount of alcoholic hydrogen chloride to a twenty percent solution of the base in anhydrous alcohol and allowing the solution to stand at five degrees centigrade for 24 hours to crystallize. The hydrochloride of 1-(2-dimethylaminoethyl)-1-(2-thenyl)-2-thiourea was obtained in the form of fine, very light buff colored crystals melting at 176–177 degrees centigrade, corrected.

Analysis of the hydrochloride: Chlorine 12.75 percent (theoretical 12.67 percent), sulfur 22.74 percent (theoretical 22.91 percent).

Example 32.—Preparation of N,N-dimethyl-N'-(2-thenyl)-N',-(2-thiazolyl)-ethylenediamine monohydrochloride A mixture of 56 grams (0.20 mole) of 1-(2-dimethylaminoethyl)-1-(2-thenyl)-2-thiourea hydrochloride, 25.4 grams (0.20 mole) of 98 percent dimethylchloroacetal and 17.0 milliliters (0.20 mole) of concentrated hydrochloric acid was stirred at 75–80 degrees centigrade for one and three-fourths hours. The reaction mixture was then cooled to 25 degrees centigrade, diluted with 40 milliliters of water, made alkaline with 40 milliliters of 40 degrees Bé. sodium hydroxide solution and the oily base extracted with 350 milliliters of benzene. The benzene extract was washed with 50 milliliters of saturated sodium sulfate solution, dried over anhydrous sodium sulfate and filtered. The clear filtrate was mixed with 39.8 milliliters of alcoholic hydrogen chloride containing 7.3 grams (0.20 mole) of hydrogen chloride and allowed to stand at five degrees centigrade for about 18 hours. The crystalline product was filtered off, washed with benzene and dried at 50 degrees centigrade. Another crop of crystals was obtained on concentration of the mother liquor, bringing the total yield of crude product up to 57.3 grams or 94 percent of theory. After recrystallizing from a mixture of n-propanol and 99 percent ethyl acetate, the pure N,N-dimethyl-N'-(2-thenyl)-N'-(2-thiazolyl)-ethylenediamine monohydrochloride was obtained as a fine light tan crystalline powder melting at 157–158 degrees centigrade corrected. The yield of pure product was 50.3 grams or 83 percent of theory.

Analysis: Chlorine 11.68 percent (theoretical 11.67 percent), sulfur 20.99 percent (theoretical 21.1 percent).

*Example 33.—Preparation of 5-bromo-2-thenyl chloride*

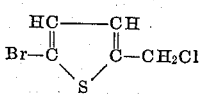

A mixture of 122 grams (0.75 mole) of 2-bromothiophene and 70 milliliters of concentrated hydrochloric acid was stirred rapidly at zero to five degrees centigrade and a rapid stream of dry hydrogen chloride passed in while 75 milliliters (1.0 mole) of 36 percent formaldehyde solution were added dropwise during two hours. Stirring and addition of dry hydrogen chloride at zero to five degrees centigrade were then continued for three hours more. The reaction mixture was diluted with 200 milliliters of water and ice, extracted with 200 milliliters of ether, and the ether layer separated, washed with three percent sodium bicarbonate solution, dried over anhydrous sodium sulfate, and the ether removed by distillation. The oily residue weighed 156 grams and analysis proved it to contain 130 grams (82 percent yield) of 5-bromo-2-thenyl chloride and a small amount of unchanged 2-bromothiophene. The crude product was not purified but used directly for the preparation of 5-bromo-2-thenyl-2-aminoethanol.

*Example 34.—Preparation of N-(5-bromo-2-thenyl)-2-aminoethanol*

One hundred and fifty-six grams of crude 5-bromo-2-thenyl chloride containing 130 grams (0.615 mole) of the pure compound was added dropwise to a mixture of 321 grams 5.26 mole) of 2-aminoethanol and 100 milliliters of specially denatured 3A alcohol, which was previously warmed to 65 degrees centigrade. The rate of addition was regulated so that the reaction temperature remained at 65-70 degrees centigrade; about one and one-quarter hours being required for the addition. The reaction mixture was allowed to stand overnight and then distilled under 30 millimeters pressure to remove the alcohol. The residue was mixed with sufficient concentrated hydrochloric acid (about 105 milliliters) to bring the pH to 3.5 and extracted with 200 milliliters of ether to remove acid insoluble by-products. It was then mixed with 60 milliliters of 40 degrees Bé. sodium hydroxide and again extracted with ether. The ether extract was washed with 50 milliliters of saturated sodium sulfate solution, dried over anhydrous sodium sulfate and all the solvent removed by distillation. The crude product weighed 125 grams and was purified by distillation under vacuum. The fraction distilling at 113-114.5 degrees centigrade under 0.16 millimeter pressure was collected separately. It was obtained as a colorless viscous liquid and found to be practically pure N-(5-bromo-2-thenyl)-2-aminoethanol.

Specific gravity 1.5482 at 25 degrees centigrade, refractive index $N_D^{25}$ 1.5580, bromine content 33.53 percent (theoretical 33.84 percent), sulfur content 13.49 percent (theoretical 13.58 percent).

The hydrochloride of the base was prepared by adding the theoretical amount of alcoholic hydrogen chloride to the base and adding ether to precipitate the hydrochloride. After recrystallization from ethylene dichloride containing a small amount of anhydrous alcohol, the pure N-(5-bromo-2-thenyl)-2-aminoethanol hydrochloride was obtained in the form of fine, white matted needles.

Melting point 131.5-132.5 degrees centigrade. Sulfur content 11.73 percent (theoretical 11.76 percent). Analysis based on total halogen content 100.36 percent.

*Example 35.—Preparation of N-(5-bromo-2-thenyl)-2-chloroethyl-1-amine hydrochloride*

A solution of 103.8 grams (0.44 mole) of N-(5-bromo-2-thenyl)-2-aminoethanol in 700 milliliters of ethylene dichloride was saturated with dry hydrogen chloride while stirring rapidly at 35-40 degrees centigrade. The mixture was then heated to 60 degrees centigrade and the dropwise addition of 63 grams (0.53 mole) of thionyl chloride started. The temperature was gradually raised so that at the end of two hours, the reaction mixture was boiling gently. The addition of the thionyl chloride required four and one-half hours. Stirring at reflux temperature was continued for two hours longer, then the heat was turned off, the stirrer stopped and the reaction mixture allowed to stand overnight. It was then concentrated by distillation to reduce the volume to 300 milliliters. The mixture was cooled to 25 degrees centigrade, the crystalline product filtered off, washed with ethylene dichloride and dried at 50 degrees centigrade. Another small crop of crystals was obtained by concentration of the mother liquor to about 50 milliliters, bringing the total yield of crude product to 115 grams. The crude product on recrystallization from specially denatured 2B alcohol, yielded 105 grams of pure N-(5-bromo-2-thenyl)-2-chloroethyl-1-amine hydrochloride melting at 167-168 degrees centigrade corrected.

Analysis based on total halogen 99.58 percent. Sulfur content 10.94 percent (theoretical 11.02 percent).

*Example 36.—Preparation of N,N-dimethyl-N'-(5-bromo-2-thenyl)-ethylenediamine*

Eighty-seven and one-half grams (0.3 mole) of N-(5-bromo-2-thenyl)-2-chloroethyl-1-amine hydrochloride was added portionwise, over a period of fifteen minutes, with rapid stirring to a mixture of 275 milliliters (1.5 moles) of aqueous dimethylamine solution and 275 milliliters of specially denatured 3A alcohol. At the start, the reaction mixture was at 25 degrees centigrade, but 20 minutes after the addition was complete the temperature was 45 degrees centigrade. Stirring was discontinued and the reaction mixture allowed to stand overnight at room temperature. It was then concentrated to about 300 milliliters by distillation under vacuum. The concentrated solution was cooled to 25 degrees centigrade and the base liberated by the addition of 60 milliliters of 40 degrees Bé. sodium hydroxide solution. The base was extracted with three 150 milliliter portions of ether, the extract dried over anhydrous potassium carbonate and the solvent removed by distillation. The oily residue was distilled under vacuum and the fraction distilling at 91-92.5 degrees centigrade at 0.21 millimeter collected separately. This fraction weighed 70.7 grams representing an 89.5 percent yield of N,N-dimethyl-N'-(5-bromo-2-thenyl)-ethylenediamine. It is a slightly yellow liquid having the following physical properties: Specific gravity 1.3183 at 25 degrees centigrade, refractive index $N_D^{25}$ 1.5470

Analysis: Bromine 30.47 percent (theoretical 30.36 percent), sulfur 12.08 percent (theoretical 12.18 percent).

The dihydrochloride was prepared by adding the theoretical amount of alcoholic hydrogen chloride to a seven percent solution of the base in specially denatured 3A alcohol, heating the mixture to dissolve the precipitated salt and allowing it to crystallize at room temperature. The crystalline product was filtered off, washed with specially denatured 3A alcohol, and dried at 50 degrees centigrade. The resulting pure N,N-dimethyl-N'-(5-bromo-2-thenyl)-ethylenediamine dihydrochloride was obtained in the form of white needles melting at 220-221 degrees centigrade corrected.

Analysis of the dihydrochloride: Analysis based on total halogen 99.94 percent, sulfur content 9.48 percent (theoretical 9.54 percent).

*Example 37.—Preparation of N-(2-dimethylaminoethyl)-N-(5-bromo-2-thenyl)-cyanamide*

Cyanogen bromide was prepared by gradually adding a solution of 18.5 grams (0.27 mole) of 95 percent potassium cyanide in 40 milliliters of water to a mixture of 43.2 grams (0.27 mole) of bromine and 150 grams of ice. After standing for about ten minutes at zero to five degrees centigrade the resulting cyanogen bromide solution was added to a mixture of 65.7 grams (0.25 mole) of N,N-dimethyl-N'-(5-bromo-2-thenyl)-ethylenediamine, 200 milliliters of ether and 150 grams of ice during fifteen minutes at zero to five degrees centigrade with constant stirring. After all the cyanogen bromide was added, the reaction mixture was stirred for fifteen minutes longer at zero to five degrees centigrade and then 30 milliliters of 40 degrees Bé. sodium hydroxide solution was added to liberate the cyanamide from its hydrobromide. The free base was extracted with a total of 350 milliliters of ether, the ether extract washed with 25 milliliters of saturated sodium sulfate solution and then dried over anhydrous sodium sulfate. After removal of the solvent by distillation, there remained 71.0 grams or a 98.4 percent yield of N-(2-dimethylaminoethyl)-N-(5-bromo-2-thenyl)-cyanamide as a light yellow oily liquid which solidified to a light tan crystalline mass on standing in the refrigerator for 24 hours. The crystalline product was found to have a melting point of 40-41 degrees centigrade.

*Example 38.—Preparation of 1-(2-dimethylaminoethyl)-1-(5-bromo-2-thenyl)-2-thiourea*

A solution of 71 grams (0.246 mole) of N-(2-dimethylaminoethyl)-N-(5-bromo-2-thenyl)-cyanamide and ten grams of anhydrous ammonia in 200 milliliters of specially denatured 3A alcohol was saturated with hydrogen sulfide at five to ten degrees centigrade during two and one-half hours. The thick crystalline suspension was allowed to stand at five degrees centigrade for 24 hours and then the crystalline product filtered off, washed with cold alcohol and dried at 50 degrees centigrade. The yield of crude product was 73 grams or 92.3 percent of theory. After recrystallization from anhydrous alcohol, 66.5 grams or an 81.7 percent yield of pure 1-(2-dimethylaminoethyl)-1-(5-bromo-2-thenyl)-2-thiourea was obtained as fine white crystals melting at 95.5-96.8 degrees centigrade.

Analysis: Bromine 24.69 percent (theoretical 24.79 percent), sulfur 19.82 percent (theoretical 19.89 percent).

The hydrochloride was prepared in almost quantative yield by adding the theoretical amount of alcoholic hydrogen chloride to a 25 percent solution of the base in anhydrous alcohol and allowing the solution to stand at five degrees centigrade for 24 hours to crystallize. The hydrochloride of 1-(2-dimethylaminoethyl)-1-(5-bromo-2-thenyl)-2-thiourea was obtained in the form of fine white crystals melting at 173-174 degrees centigrade corrected.

Analysis of the hydrochloride: Sulfur 17.89 percent (theory 17.87 percent).

*Example 39.—Preparation of N,N-dimethyl-N'-(5-bromo-2-thenyl)-N'-(2-thiazolyl)-ethylenediamine monohydrochloride*

A mixture of 57.4 grams (0.16 mole) of 1-(2-dimethylaminoethyl)-1-(5-bromo-2-thenyl)-2-thiourea hydrochloride, 20.3 grams (0.16 mole) of 98 percent dimethylcholoroacetal and 13.6 milliliters (0.16 mole) of concentrated hydrochloric acid was stirred at 75-80 degrees centigrade for two and one-quarter hours. The reaction mixture was then cooled to 25 degrees centigrade, diluted with 30 milliliters of water, made alkaline with 35 milliliters of 40 degrees Bé. sodium hydroxide solution and the oily base extracted with 250 milliliters of benzene. The benzene extract was washed with 50 milliliters of saturated sodium sulfate solution, dried over anhydrous sodium sulfate and filtered. The clear filtrate was mixed with 31.4 milliliters of alcoholic hydrogen chloride containing 5.7 grams (0.157 mole) of hydrogen chloride and allowed to stand at five degrees centigrade for about 18 hours. The crystalline product was filtered off, washed with benzene and dried at 50 degrees centigrade. Two more small crops of crystals were obtained by concentrating the mother liquor, bringing the total yield of crude product up to 55.3 grams or 90.2 percent of theory. After recrystallizing from a mixture of normal propanol and 99 percent ethyl acetate, the pure N,N-dimethyl-N'-(5-bromo-2-thenyl)-N'-(2-thiazolyl)-ethylenediamine monohydrochloride was obtained as a fine, light tan crystalline powder melting at 166-167 degrees centigrade.

Analysis: Sulfur 16.64 percent (theoretical 16.75 percent).

*Example 40.—Preparation of N-(2-dimethylaminoethyl)-N-(p-methoxybenzyl)-cyanamide*

A solution of 44 grams (0.59 mole) of sodium hypochlorite in 421 milliliters of water was added to a mixture of 39.2 grams (0.59 mole) of potassium cyanide, 700 grams of ice and 100 milliliters (1.2 moles) of concentrated hydrochloric acid with continuous stirring over a period of ten minutes. To the resulting solution of cyanogen chloride, was added rapidly with stirring, 104 grams (0.5 mole) of N,N-dimethyl-N'-(p-methoxybenzyl)-ethylenediamine. After the addition, stirring was continued for five minutes longer and then a solution of 60 grams (1.5 moles) of sodium hydroxide in 100 milliliters of water was added. The free base was extracted with 300 milliliters of ether, the ether extract washed with saturated sodium sulfate solution and dried over anhydrous sodium sulfate. After removal of the solvent by distillation there remained 99.7 grams of N-(2-dimethylaminoethyl)-N-(p-methoxybenzyl)-cyanamide as a light orange colored liquid which on analysis was found to have a purity of 86 percent.

Example 41.—Preparation of N-(2-dimethylaminoethyl)-(p-methoxybenzyl)-cyanamide A solution of cyanogen chloride was prepared by passing 244 grams (3.4 moles) of chlorine into a suspension of 224 grams (3.4 moles) of 99 percent potassium cyanide in 820 milliliters of ethylene dichloride and 24 milliliters (0.4 mole) of acetic acid over a period of about three hours at zero to five degrees centigrade. The resulting cyanogen chloride was then distilled directly into a mixture of 550 grams (2.42 moles) of 95 percent N,N - dimethyl-N'-(p-methoxybenzyl)-ethylenediamine and 1800 milliliters of water at five to fifteen degrees contigrade with constant stirring. The addition of cyanogen chloride was continued until the reaction mixture was at pH 6.5 and a slight excess of cyanogen chloride was present. Stirring was continued for one-half hour longer, then the resulting cyanamide was liberated from the hydrochloride by the addition of a solution of 125 grams of sodium hydroxide in 200 milliliters of water. The oily product was extracted with 1000 milliliters of benzene, the benzene extract washed with a saturated solution of sodium sulfate and then dried over anhydrous sodium sulfate. On removal of the solvent by distillation there remained 561 grams of N-(2 - dimethylaminoethyl)-N-(p-methoxybenzyl)-cyanamide as a light orange colored liquid. It was found to have a specific gravity of 1.0440 at 25 degrees centigrade, a refractive index of $N_D^{25}$ 1.5260 and a purity of 91.5 percent determined by potentiometric titration to pH 6.9.

Example 42.—Preparation of N-(2-dimethylaminoethyl)-N-(p-methoxybenzyl)-cyanamide A solution of cyanogen chloride was prepared by passing 244 grams (3.4 moles) of chlorine into a suspension of 244 grams (3.4 moles) of 99 percent potassium cyanide in 1100 milliliters of ethylene dichloride and 15 milliliters (0.25 mole) of acetic acid over a period of five hours at zero to five degrees centigrade. The resulting reaction mixture was then added to a solution of 696 grams (3.22 moles) of 96 percent N,N-dimethyl - N' - (p - methoxybenzyl)-ethylenediamine in 1800 milliliters of water at 10 to 15 degrees centigrade with rapid stirring, over a period of one hour. The mixture was stirred for fifteen minutes longer and then allowed to separate into two layers. The lower ethylene dichloride layer was drawn off and discarded. The remaining aqueous layer was made alkaline by the addition of a solution of 160 grams (3.85 moles) of sodium hydroxide in 250 milliliters of water and the N-(2-dimethylaminoethyl)-N-(p-methoxybenzyl)-cyanamide extracted with 1600 milliliters of ethylene dichloride. The ethylene dichloride extract was washed with water, then dried over anhydrous sodium sulfate. After removal of all the solvent by distillation under vacuum there remained 660 grams of N-(2-dimethylaminoethyl) - N - (p - methoxybenzyl)-cyanamide as a light orange colored liquid. It was found to have a specific gravity of 1.0411 at 25 degrees centigrade, a refractive index of $N_D^{25}$ 1.5257 and a purity of 90.4 percent determined by potentiometric titration to pH 6.9.

Example 43.—Preparation of 1-(2 - dimethylaminoethyl)-1-(p-methoxybenzyl)-2-thiourea One hundred and fifty-six grams (0.58 mole) of 86.8 percent N-(2-dimethylaminoethyl)-N-(p - methoxybenzyl) - cyanamide was rapidly stirred at 60 degrees centigrade and hydrogen sulfide passed in during three hours at about atmospheric pressure. The weight of the reaction mixture increased by 19 grams or the equivalent of 0.56 mole of hydrogen sulfide. It was diluted with 40 milliliters of carbon tetrachloride to reduce the viscosity of the mixture and then poured into 400 milliliters of cyclohexane. The resulting mixture was stirred and cooled to 25 degrees centigrade, the fine crystalline product filtered off, washed with 200 milliliters of cyclohexane and dried at 50 degrees centigrade. The dry crude 1-(2-dimethylaminoethyl)-1-(p-methoxybenzyl)-2-thiourea which weighed 161 grams was obtained as a fine white crystalline powder. This was dissolved in 570 milliliters of anhydrous specially denatured alcohol 2B, 81 milliliters (0.575 mole) of alcoholic hydrogen chloride (0.259 gram HCl per milliliter) added and the hydrochloride allowed to crystallize. The product was filtered off, washed with anhydrous specially denatured alcohol 2B and dried at 50 degrees centigrade. The dry white crystalline product weighed 158 grams and was found to be practically pure 1 - (2 - dimethylaminoethyl) - 1 - (p - methoxybenzyl) - 2 - thiourea hydrochloride melting at 158–160 degrees centigrade. On analysis it was found to contain 11.63 percent chlorine (theoretical=11.67 percent chlorine).

Various modifications may be made in the method of the present invention without departing from the spirit or scope thereof, and it is to be understood that we limit ourselves only as defined in the appended claims.

We claim:

1. A process for the preparation of a substituted thiazole having the formula

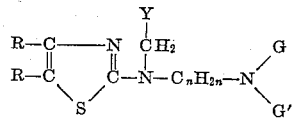

in which R is a radical of the group consisting of hydrogen, alkyl, aralkyl and aryl radicals; Y is a radical of the group consisting of phenyl, cycloalkyl, thienyl and alkyl-substituted, alkoxy-substituted, halogen-substituted and nuclearly hydroxy-substituted phenyl, cycloalkyl and thienyl radicals, G and G' are each radicals of the group consisting of alkyl and aralkyl radicals and, where G and G' are not as aforesaid, then

is a heterocyclic ring selected from the group consisting of pyrrolidino, piperidino, morpholino, thiomorpholino and methylpiperidino and $n$ is an integer from 1 to 4, inclusive, which comprises (1) the reaction of cyanogen halide with a secondary amine having the formula

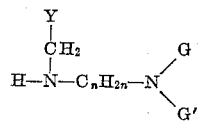

in which Y, G and G' have the foregoing significance, to produce the corresponding cyanamide having the formula:

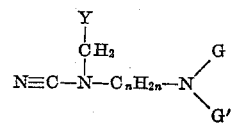

(2) reacting the resulting cyanamide with hydrogen sulfide to produce the corresponding thiourea having the formula

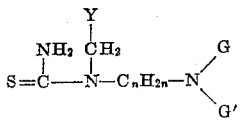

and (3) subsequently reacting the resulting thiourea with a carbonyl compound of the group consisting of compounds having the formula

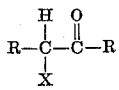

in which R is a radical of the group consisting of hydrogen, alkyl, aralkyl and aryl radicals and X is a halogen of the group consisting of chlorine, bromine and iodine, and acetals of the said carbonyl compounds, and subsequently recovering the resulting substituted thiazole.

2. A process for the preparation of a substituted thiazole having the formula:

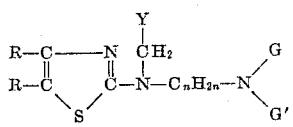

in which R is a radical of the group consisting of hydrogen, alkyl, aralkyl and aryl radicals; Y is a radical of the group consisting of phenyl, cycloalkyl, thienyl and alkyl-substituted, alkoxy-substituted, halogen-substituted and nuclearly hydroxy-substituted phenyl, cycloalkyl and thienyl radicals; G and G' are each radicals of the group consisting of alkyl and aralkyl radicals and, where G and G' are not as aforesaid, then

is a heterocyclic ring selected from the group consisting of pyrrolidino, piperidino, morpholino, thiomorpholino and methylpiperidino and $n$ is an integer from 1 to 4, inclusive, which comprises heating together a substituted thiourea having the formula

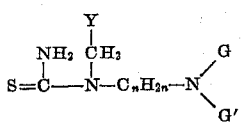

with a carbonyl compound of the group consisting of compounds having the formula

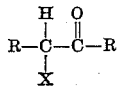

in which R is a radical of the group consisting of hydrogen, alkyl, aralkyl and aryl radicals and X is a halogen of the group consisting of chlorine, bromine and iodine, and acetals of the said carbonyl compounds, in an acidic medium, and subsequently recovering the resulting substituted thiazole.

3. A process as defined in claim 2 in which the temperature of the heating is maintained between approximately room temperature and approximately 120 degrees centigrade.

4. A process for the preparation of N,N-dimethyl-N'-(2-thenyl)-N - (2 - thiazolyl) - ethylenediamine which comprises heating together at a temperature between approximately room temperature and approximately 120 degrees centigrade dimethylchloroacetal and 1-(2-dimethylaminoethyl)-1-(2-thenyl) - 2 - thiourea hydrochloride in an acidic medium and subsequently recovering the resulting N,N-dimethyl-N'-(2-thenyl)-N'-(2-thiazolyl)-ethylenediamine.

5. A process for the preparation of N,N-dimethyl-N'-(5-bromo-2-thenyl)-N' - (2 - thiazolyl)-ethylenediamine which comprises heating together at a temperature between approximately room temperature and approximately 120 degrees centigrade dimethylchloroacetal and 1-(2-dimethylaminoethyl)-1-(5-bromo-2 - thenyl) - 2-thiourea in an acidic medium and subsequently recovering the resulting N,N-dimethyl-N'-(5-bromo-2-thenyl)-N'-(2 - thiazolyl) - ethylenediamine.

CLARENCE W. SONDERN.
PHILIP J. BREIVOGEL.

References Cited in the file of this patent

UNITED STATES PATENTS

| Number | Name | Date |
|---|---|---|
| 2,106,552 | Jenkins | Jan. 25, 1938 |
| 2,254,136 | Buck | Aug. 26, 1941 |
| 2,293,027 | Ericks | Aug. 18, 1942 |
| 2,311,281 | Roblin | Feb. 16, 1943 |
| 2,440,703 | Sondern | May 4, 1948 |
| 2,502,151 | Herclois | Mar. 28, 1950 |

OTHER REFERENCES

Huttrer et al.: Enzymologia (Acta Biocatylica), vol. 13, pp. 292, 319, April 26, 1948.

Traumann: Annalen, vol. 249, p. 36.